US012620419B2

(12) United States Patent　　(10) Patent No.:　US 12,620,419 B2

Hong　　(45) Date of Patent:　　May 5, 2026

(54) REMOTE TRANSMISSION CONTROLLABLE EXTERNAL OPTICAL DISC DRIVER DATA PROCESSING METHOD AND DEVICE

(71) Applicant: Shenzhen Zhonglin Information Technology Co., Ltd., Shenzhen (CN)

(72) Inventor: Weibing Hong, Shenzhen (CN)

(73) Assignee: Shenzhen Zhonglin Information Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/002,056

(22) Filed: Dec. 26, 2024

(65) Prior Publication Data

US 2025/0124954 A1　　Apr. 17, 2025

(30) Foreign Application Priority Data

Sep. 14, 2024　(CN) .......................... 202411297122.1

(51) Int. Cl.
G11B 27/00　　(2006.01)
G11B 27/10　　(2006.01)
G11B 7/00　　(2006.01)

(52) U.S. Cl.
CPC .......... G11B 27/105 (2013.01); G11B 27/002 (2013.01); G11B 2220/2537 (2013.01)

(58) Field of Classification Search
CPC ............ G11B 27/00; G11B 7/00; G11B 31/00

USPC ........ 386/239, 248, 247, 278, 286, 287, 288
See application file for complete search history.

(56) References Cited

U.S. PATENT DOCUMENTS

| | | | | |
|---|---|---|---|---|
| 2004/0257964 A1* | 12/2004 | Watabe | ................ | G11B 7/1267 |
| 2009/0177556 A1* | 7/2009 | Matsuo | .............. | G06Q 30/0641 |
| | | | | 705/26.1 |
| 2010/0234237 A1 | 9/2010 | Yoo | | |
| 2011/0182155 A1 | 7/2011 | Heitlinger | | |
| 2012/0200951 A1* | 8/2012 | Koda | ..................... | G11B 20/10 |
| 2014/0078317 A1 | 3/2014 | Nakano et al. | | |
| 2015/0100883 A1* | 4/2015 | Kern | ................... | H04L 67/1097 |
| | | | | 715/716 |

* cited by examiner

*Primary Examiner* — Daquan Zhao

(57)　　　　ABSTRACT

Disclosed is a remote transmission controllable external optical disc driver data processing method and device. The method includes: processing optical disc data objects converted by a decoding module by a microprocessor and transmitting the optical disc data objects to a remote server and a mobile terminal to be stored; transmitting the optical disc data objects to be burnt in a local or remote server to a memory chip configured in a storage module; and converting analog signals by the decoding module into digital signals and burning the digitals signal into a blank optical disc. According to the present disclosure, the application efficiency of the optical disc driver device is improved, and the application scenarios are expanded.

10 Claims, 11 Drawing Sheets

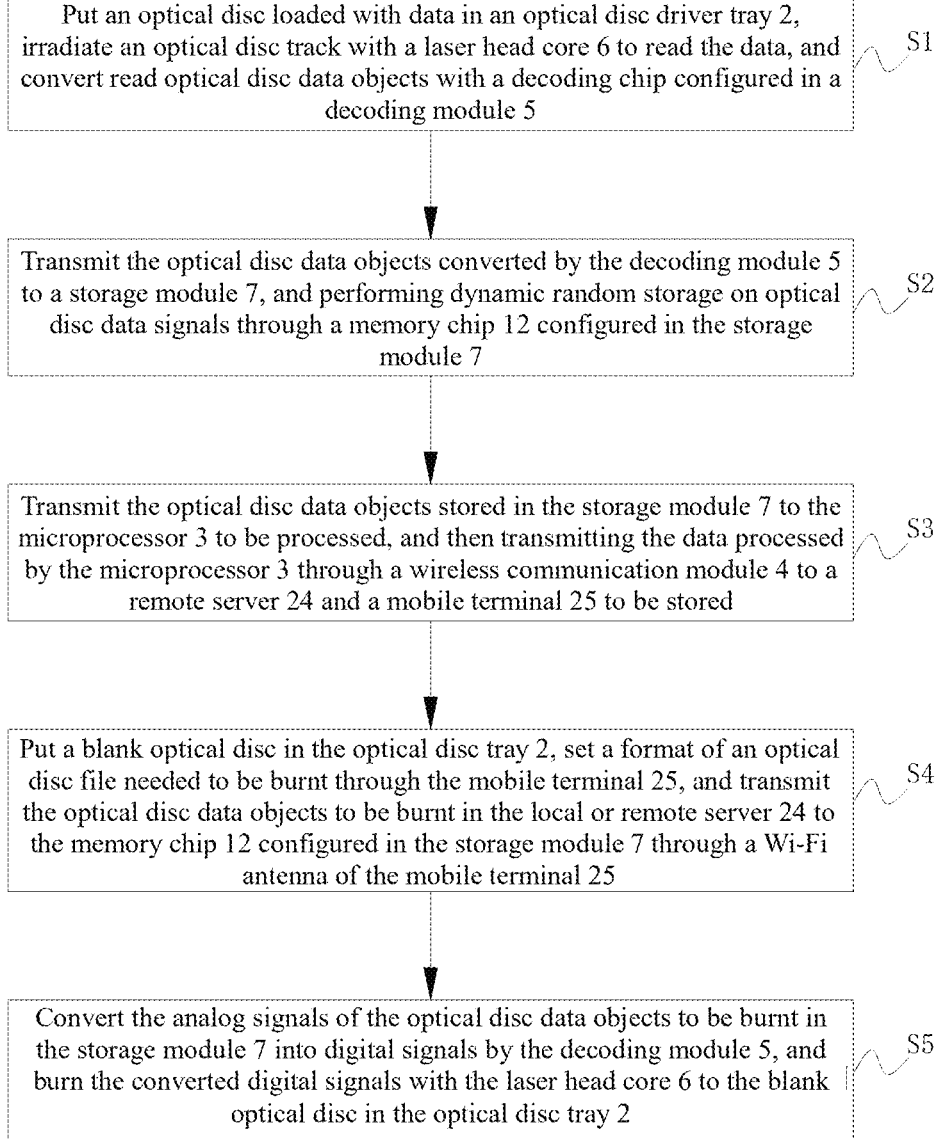

Put an optical disc loaded with data in an optical disc driver tray 2, irradiate an optical disc track with a laser head core 6 to read the data, and convert read optical disc data objects with a decoding chip configured in a decoding module 5 ∿ S1

Transmit the optical disc data objects converted by the decoding module 5 to a storage module 7, and performing dynamic random storage on optical disc data signals through a memory chip 12 configured in the storage module 7 ∿ S2

Transmit the optical disc data objects stored in the storage module 7 to the microprocessor 3 to be processed, and then transmitting the data processed by the microprocessor 3 through a wireless communication module 4 to a remote server 24 and a mobile terminal 25 to be stored ∿ S3

Put a blank optical disc in the optical disc tray 2, set a format of an optical disc file needed to be burnt through the mobile terminal 25, and transmit the optical disc data objects to be burnt in the local or remote server 24 to the memory chip 12 configured in the storage module 7 through a Wi-Fi antenna of the mobile terminal 25 ∿ S4

Convert the analog signals of the optical disc data objects to be burnt in the storage module 7 into digital signals by the decoding module 5, and burn the converted digital signals with the laser head core 6 to the blank optical disc in the optical disc tray 2 ∿ S5

FIG. 1

| 1 | 2 | 3 |
|---|---|---|
| 4 | 14 | 6 |
| 7 | 8 | 9 |

Mean value : 6

| 1 | 2 | 3 |
|---|---|---|
| 4 | 6 | 6 |
| 7 | 8 | 9 |

Mean value : 5.1111

FIG. 4

| 5 | 4 | 5 |
|---|---|---|
| 2 | 11 | 2 |
| 8 | 7 | 0 |

( Sequencing )

0, 2, 2, 4, 5, 5, 7, 8, 11

| 5 | 4 | 5 |
|---|---|---|
| 2 | 5 | 2 |
| 8 | 7 | 0 |

FIG. 5

| 10 | 20 | 15 |
|----|----|----|
| 30 | 40 | 25 |
| 18 | 22 | 16 |

Standard deviation
σ=1; calculate a
corresponding
Gaussian weight

| 1/16 | 2/16 | 1/16 |
|------|------|------|
| 2/16 | 4/16 | 2/16 |
| 1/16 | 2/16 | 1/16 |

REMOTE TRANSMISSION CONTROLLABLE EXTERNAL OPTICAL DISC DRIVER DATA PROCESSING METHOD AND DEVICE

CROSS-REFERENCE TO RELATED APPLICATIONS

This application claims priority to Chinese Patent Application No. CN 202411297122.1, filed on Sep. 14, 2024. The content of the aforementioned application, including any intervening amendments thereto, is incorporated herein by reference.

BACKGROUND OF THE INVENTION

1. Technical Field

The present disclosure relates to a remote transmission controllable external optical disc driver data processing and device and belongs to the technical field of optical disc driver devices.

2. Description of Related Art

An optical disc driver is a device for writing and reading contents of an optical disc in a computer and is common in a desktop computer and a portable computer. The optical disc driver is mainly used to read audios, videos, and files in the optical disc or burn the audios, videos, and files to the optical disc, and can play audio or video optical discs, install software, and store mass data.

However, with the arrival of the digital era, many software, information, and files can be loaded and used through the Internet without using the optical disc. Besides, the computer is gradually light and portable, and canceling the optical disc driver can save the space of the computer more effectively. With the development of USB interfaces, Wi-Fi connection, and Bluetooth technology, it is more convenient to use mobile storage devices, which replaces the usage scenarios of a part of optical discs. Therefore, although the optical disc has not yet disappeared, the demand on the optical disc has been gradually decreased, so that most computers are no longer equipped with the optical disc. In order to adapt to changes of the computer technology, so as to improve the application efficiency of the optical disc driver and expand the application scenarios of the optical disc driver, it is necessary to research and develop an independent external optical disc driver technical solution to wirelessly transmit data in the optical disc to a mobile terminal.

BRIEF SUMMARY OF THE INVENTION

Therefore, the disclosure provides a remote transmission controllable external optical disc driver data processing method and device, which solves the problem that a conventional optical disc driver that is low in using efficiency and large in limitation of application scenario hardly meets the usage requirements of users.

In order to achieve the object, the present disclosure provides the following technical solution: a remote transmission controllable external optical disc driver data processing method, including the following steps:

putting an optical disc loaded with data in an optical disc driver tray, irradiating an optical disc track with a laser head core to read the data, and converting read optical disc data objects with a decoding chip configured in a decoding module;

transmitting the optical disc data objects converted by the decoding module to a storage module, and performing dynamic random storage on optical disc data signals through a memory chip configured in the storage module;

transmitting the optical disc data objects stored in the storage module to the microprocessor to be processed, and then transmitting the data processed by the microprocessor through a wireless communication module to a remote server and a mobile terminal to be stored;

putting a blank optical disc in the optical disc tray, setting a format of an optical disc file needed to be burnt through the mobile terminal, and transmitting the optical disc data objects to be burnt in the local or remote server to the memory chip configured in the storage module through a Wi-Fi antenna of the mobile terminal; and converting the analog signals of the optical disc data objects to be burnt in the storage module into digital signals by the decoding module, and burning the converted digital signals with the laser head core to the blank optical disc in the optical disc tray.

As a preferred solution of the remote transmission controllable external optical disc driver data processing method, the process of converting the analog signals of the optical disc data objects to be burnt in the storage module into digital signals by the decoding module includes:

performing sampling according to a preset frequency and a time interval, and dividing an amplitude range of each sampled sample into a plurality of intervals; sampling each interval sample, and quantifying the sample by a preset filtering algorithm to limited discrete values; and binarily encoding quantified digital values to obtain the digital signals.

As a preferred solution of the remote transmission controllable external optical disc driver data processing method, the preset filtering algorithm is mean filtering, and a mean filtering process includes:

replacing each numerical value of the analog signals with a mean value of numerical values in a neighborhood thereof; for a filter window with the size of m×n, assuming that pixel values in the window are respectively p1, p2, p3, . . . , p(m×n), a new value P of a center pixel after mean filtering is: P=(p1+p2+p3+ . . . +p(m×n))/(m×n).

As a preferred solution of the remote transmission controllable external optical disc driver data processing method, the preset filtering algorithm is median filtering, and a median filtering process includes:

assuming that there is a one-dimensional digital sequence x[1], x[2], . . . , x[m], wherein the size of the window of median filtering is m; for each element x[i] in the digital sequence, taking m elements around the element x[i], i.e., x[i−(m−1)/2], . . . , x[i], . . . , x[i+(m−1)/2]; and sequencing the m elements, and replacing the original element x[i] with a sequenced median value as an output value.

As a preferred solution of the remote transmission controllable external optical disc driver data processing method, the preset filtering algorithm is Gaussian filtering, and a Gaussian filtering process includes:

using a 3×3 Gaussian kernel, setting a standard deviation σ according to requirements, calculating a corresponding Gaussian weight, filtering a center pixel value, and then calculating a Gaussian weight for each pixel in an image to process the image by Gaussian filtering.

The present disclosure further provides a remote transmission controllable external optical disc driver device, used for the remote transmission controllable external optical disc driver data processing method, including an optical disc driver housing, where an optical disc driver tray is arranged in the optical disc driver housing, and further including a microprocessor, a wireless communication module, a decoding module, a storage module, and a bridging module, where the wireless communication module and the microprocessor are electrically connected, the wireless communication module is used in the external optical disc driver device and a remote server, a connection relation is established between the external optical disc driver device and the mobile terminal for wireless transmission of audios, videos, and files, and data in an optical disc is read to the mobile terminal and the remote server or data in the mobile terminal and the remote server is burnt to the optical disc through the wireless communication module;

the decoding module and the microprocessor are electrically connected, the decoding module is electrically connected to a laser head core, the decoding module is configured to decode and read the data in the optical disc put in the optical disc driver tray through the laser head core to obtain optical disc data signals;

the storage module and the microprocessor are electrically connected, and the storage module is configured to perform dynamic random storage on the optical disc data signals read by the decoding module; and the bridging module and the microprocessor are electrically connected, the bridging module is configured with a USB-SATA bridging chip, and the bridging module is configured to connect the external optical disc driver device to an appointed device through a PATA/SATA interface configured in the USB-SATA bridging chip.

As a preferred solution of the remote transmission controllable external optical disc driver device, the wireless communication module is configured with a WiFi single chip, the WiFi single chip carries an external onboard antenna, and a model of the WiFi single chip is MT7612EN; and the mobile terminal is configured with a player module, a cloud disc module, a local module, a personal account center module, a burning/reading module, a music module, a video module, and a file module.

As a preferred solution of the remote transmission controllable external optical disc driver device, the decoding module is configured with a CD/DVD/Blu-ray drive decoding chip, and a model of the CD/DVD/Blu-ray drive decoding chip is MT1887/MT1865/MT3118/MT8581; and the laser head core is located in the optical disc driver housing, and a model of the laser head core is CM1388/BW-16D1H-U PRO.

As a preferred solution of the remote transmission controllable external optical disc driver device, the storage module is configured with a memory chip, and a model of the memory chip is A3R1GE30JBF/MX2516433f/W25Q16DVZPIG/MX25V20066; and a model of the USB-SATA bridging chip is INIC-1618N/μPD720231/JMS578.

As a preferred solution of the remote transmission controllable external optical disc driver device, an RGB atmosphere lamp is arranged on a side part of the optical disc driver housing, and the RGB atmosphere lamp and the microprocessor are electrically connected; and an indicator lamp is further arranged on a front part of the optical disc driver tray, and the indicator lamp and the microprocessor are electrically connected; the indicator lamp is configured to indicate a working state of the external optical disc driver device.

As a preferred solution of the remote transmission controllable external optical disc driver device, an eject button is further arranged on the front part of the optical disc driver tray; the eject button is configured to eject the optical disc driver tray;

a forced eject hole is further formed in the front part of the optical disc driver tray, and a forced operation is carried out through the forced eject hole to take out the optical disc in the optical disc driver tray and restore a normal working state;

a charging port is further arranged on a rear side of the optical disc driver housing, and the charging port and the microprocessor are electrically connected; the charging port is configured to supply power to the external optical disc driver device; and a data expansion interface is further arranged on the rear side of the optical disc driver housing, and the data expansion interface includes an SD card interface, a TF card interface, a USB3.0 interface, a Type-C interface, and an HDMI interface; and the data expansion interface and the microprocessor are electrically connected, and the data expansion interface is configured to directly transmit the data to a vehicle-mounted system/computer/television by the external optical disc driver device.

The present disclosure has the following advantages: the method includes the following steps: putting an optical disc loaded with data in an optical disc driver tray, irradiating an optical disc track with a laser head core to read the data, and converting read optical disc data objects with a decoding chip configured in a decoding module; transmitting the optical disc data objects converted by the decoding module to a storage module, and performing dynamic random storage on optical disc data signals through a memory chip configured in the storage module; transmitting the optical disc data objects stored in the storage module to the microprocessor to be processed, and then transmitting the data processed by the microprocessor through a wireless communication module to a remote server and a mobile terminal to be stored; putting a blank optical disc in the optical disc tray, setting a format of an optical disc file needed to be burnt through the mobile terminal, and transmitting the optical disc data objects to be burnt in the local or remote server to the memory chip configured in the storage module through a Wi-Fi antenna of the mobile terminal; and converting the analog signals of the optical disc data objects to be burnt in the storage module into digital signals by the decoding module, and burning the converted digital signals with the laser head core to the blank optical disc in the optical disc tray. The present disclosure is capable of adapting to changes of the computer technology, improves the application efficiency of the optical disc driver device, expands the application scenarios of the optical disc driver device, and is capable of meeting the diversified usage requirements of users.

BRIEF DESCRIPTION OF THE SEVERAL VIEWS OF THE DRAWINGS

In order to describe the embodiment of the present disclosure or the technical solution in the prior art clearer, the drawings needed to be used in description of the embodiment or the prior art will be briefly introduced below. It is apparent that the drawings described below are merely exemplary, and those of ordinary skill in the art further can obtain other drawings of the embodiments according to extension of the drawings provided without making creative efforts.

Structures, proportions, sizes, and the like shown by the drawings of the description are only used for matching with contents disclosed by the description to be understood and read by those skilled in the field rather than limiting applicable limitation conditions of the present disclosure. Thus, structures, proportions, sizes, and the like do not have technical substantive meaning. Any structural modification, change of proportional relations or adjustment of size shall fall within the scope covered by the technical content disclosed by the present disclosure without affecting functions which can be generated and purposes which can be achieved.

FIG. 1 is a schematic diagram of a flowchart of a remote transmission controllable external optical disc driver data processing method provided in an embodiment of the present disclosure;

FIG. 4 is a schematic diagram of mean filtering in remote transmission controllable external optical disc driver data processing provided by an embodiment of the present disclosure;

FIG. 5 is a schematic diagram of median filtering in remote transmission controllable external optical disc driver data processing provided by an embodiment of the present disclosure;

FIG. 6 is a schematic diagram of Gaussian filtering in remote transmission controllable external optical disc driver data processing provided by an embodiment of the present disclosure;

In the figures, 1, optical disc driver housing; 2, optical disc driver tray; 3, microprocessor; 4, wireless communication module; 5, decoding module; 6, laser head core; 7, storage module; 8, bridging module; 9, USB-SATA bridging chip; 10, WiFi single chip; 11, CD/DVD/Blu-ray drive decoding chip; 12, memory chip; 13, RGB atmosphere lamp; 14, indicator lamp; 15, eject button; 16, forced eject hole; 17, charging port; 18, data expansion interface; 19, SD card interface; 20, TF card interface; 21, USB3.0 interface; 22, Type-C interface; 23, HDMI interface; 24, remote server; 25, mobile terminal.

DETAILED DESCRIPTION OF THE INVENTION

The implementation of the present disclosure will be illustrated below in conjunction with specific embodiments. Those skilled in the art can easily understand other advantages and effects of the present disclosure from the content disclosed in this specification. Obviously, the described embodiments are merely a part rather than all of the embodiments of the present disclosure. All other embodiments obtained by those of ordinary skill in the art based on the embodiments of the present disclosure without making creative efforts shall fall within the scope of protection of the present disclosure.

Figure 2:
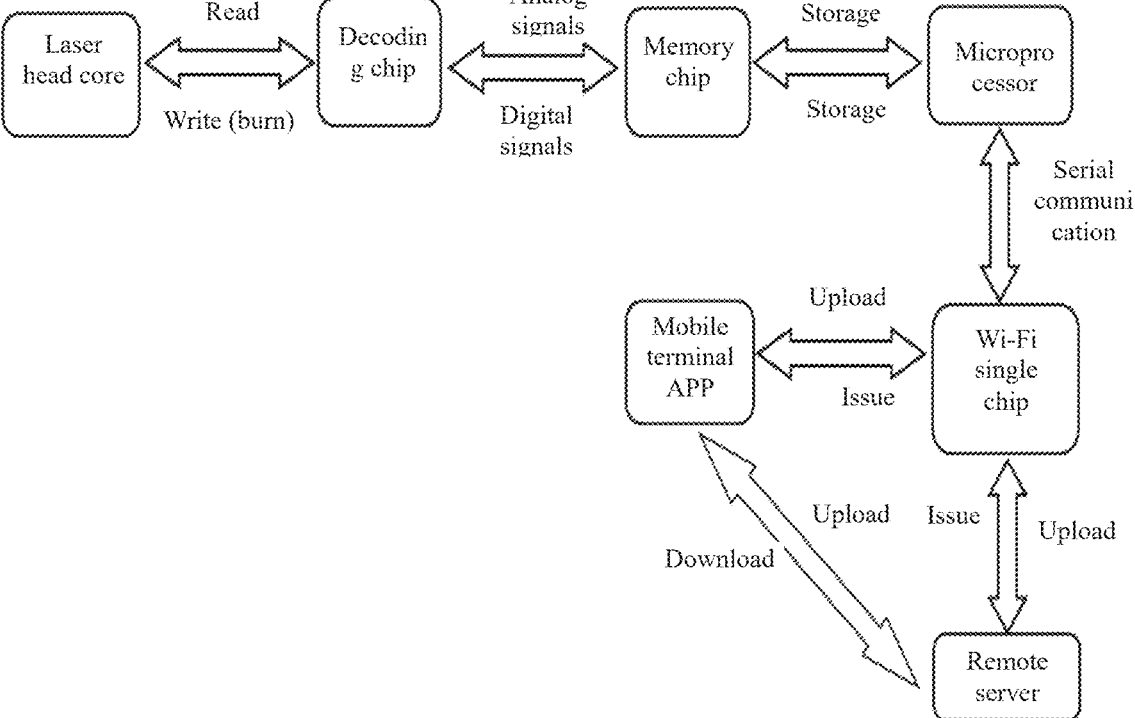
FIG. 2 is a schematic diagram of data transmission in a remote transmission controllable external optical disc driver data processing course provided by an embodiment of the present disclosure.

Referring to FIGS. 1 and 2, the embodiment of the present disclosure provides a remote transmission controllable external optical disc driver data processing method, including the following steps:

S1, an optical disc loaded with data is put in an optical disc driver tray 2, an optical disc track is irradiated with a laser head core 6 to read the data, and read optical disc data objects are converted with a decoding chip configured in a decoding module 5;

S2, the optical disc data objects converted by the decoding module 5 are transmitted to a storage module 7, and dynamic random storage is performed on optical disc data signals through a memory chip 12 configured in the storage module 7;

S3, the optical disc data objects stored in the storage module 7 are transmitted to the microprocessor 3 to be processed, and then the data processed by the microprocessor 3 is transmitted through a wireless communication module 4 to a remote server 24 and a mobile terminal 25 to be stored;

S4, a blank optical disc is put in the optical disc tray 2, a format of an optical disc file needed to be burnt is set through the mobile terminal 25, and the optical disc data objects to be burnt in the local or remote server 24 are transmitted to the memory chip 12 configured in the storage module 7 through a Wi-Fi antenna of the mobile terminal 25; and S5, the analog signals of the optical disc data objects to be burnt in the storage module 7 are converted into digital signals by the decoding module 5, and the converted digital signals are burned with the laser head core 6 to the blank optical disc in the optical disc tray 2.

In the embodiment, the CD/DVD/Blu-ray optical disc loaded with data is put in the optical disc driver tray 2, different t tracks of the optical disc are irradiated with the laser head core to read the optical disc data objects, and the optical disc data objects convert the signals through the decoding chip.

The memory chip 12 performs dynamic random storage on the signals of the optical disc data objects, transmits the stored data to an ARM microprocessor 3 orderly for processing, and can transmit the file data, videos and audios in the processed optical disc data objects to the remote server 24 and the APP of the mobile terminal 25 for storage by connecting a Wi-Fi single chip in serial communication. When it is needed to write data, the blank optical disc is put in the optical disc driver tray 2, and the function of the mobile terminal 25 is enabled to transmit the format file to be burnt to the optical disc driver to be directly burnt to the optical disc through a Wi-Fi antenna.

In the embodiment, the APP of the mobile terminal 25 can set different optical disc formats (CD/DVD/Blu-ray), and can select reading and writing functions of the optical disc. In the data writing process, local files, pictures, and videos of the mobile terminal can be called or files, pictures, and videos in the cloud remote server 24 are directly acquired for burning. Signals are received through the Wi-Fi antenna to perform microwave despreading and uncompressing on contents. Finally, the contents are restored to simulated content signals. The decoding chip converts the signals into digital signals, and the digital signals are burnt in the optical disc through the laser head core 6.

In the data reading process, the content signals of the optical disc can also be encoded and compressed, are subjected to digital microwave channel modulation, are emitted through the Wi-Fi antenna, and are directly uploaded to the local mobile terminal 25 or stored in the cloud remote server 24. Moreover, the contents in the optical disc can also be played online in real time with the APP of the mobile terminal 25.

In the embodiment, the process of converting the analog signals of the optical disc data objects to be burnt in the storage module 7 into digital signals by the decoding module 5 includes:

> sampling is performed according to a preset frequency and a time interval, and an amplitude range of each sampled sample is divided into a plurality of intervals; each interval sample is sampled, and the sample is quantified by a preset filtering algorithm to limited discrete values; and quantified digital values are binarily encoded to obtain the digital signals.

Figure 3:
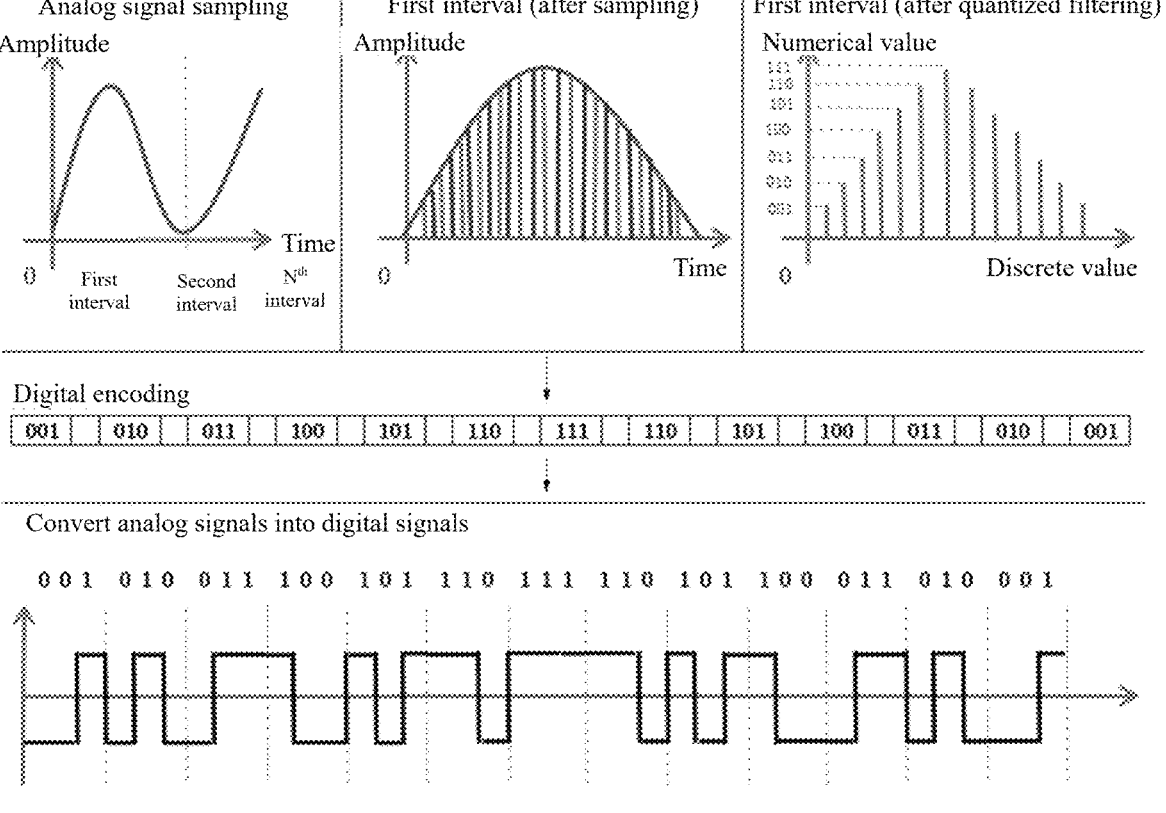
FIG. 3 is a decoding schematic diagram of remote transmission controllable external optical disc driver data processing provided by an embodiment of the present disclosure.
Figure 7:
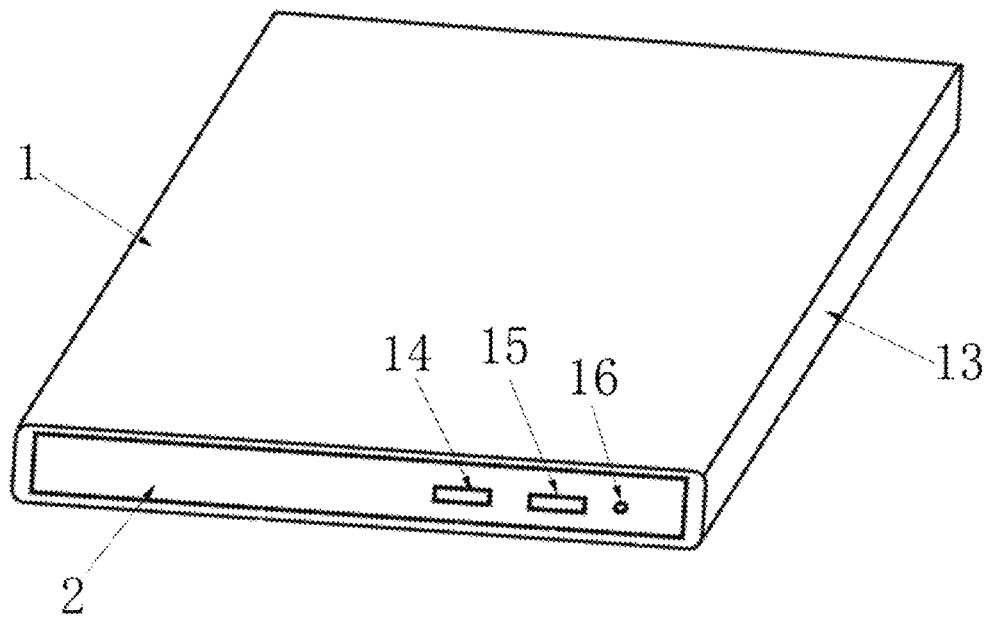
FIG. 7 is a schematic structural diagram of a remote transmission controllable external optical disc driver device provided in an embodiment of the present disclosure.
Figure 8:
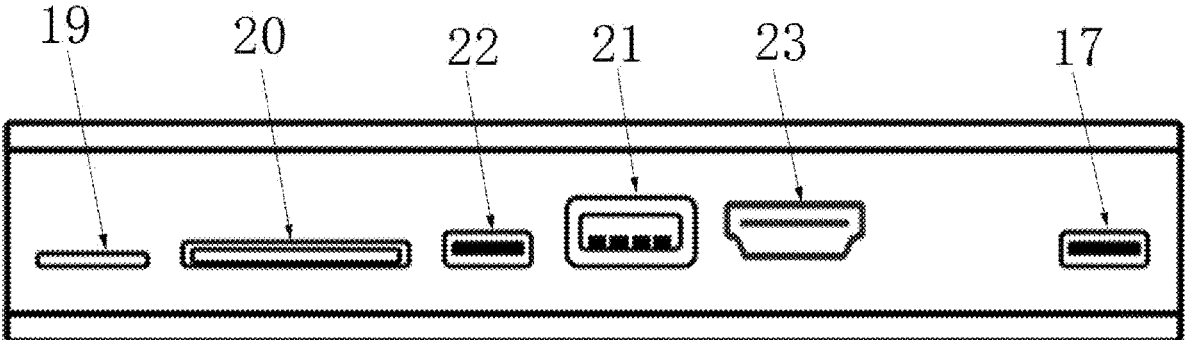
FIG. 8 is a schematic diagram of an interface of a remote transmission controllable external optical disc driver device provided in an embodiment of the present disclosure.
Figure 9:
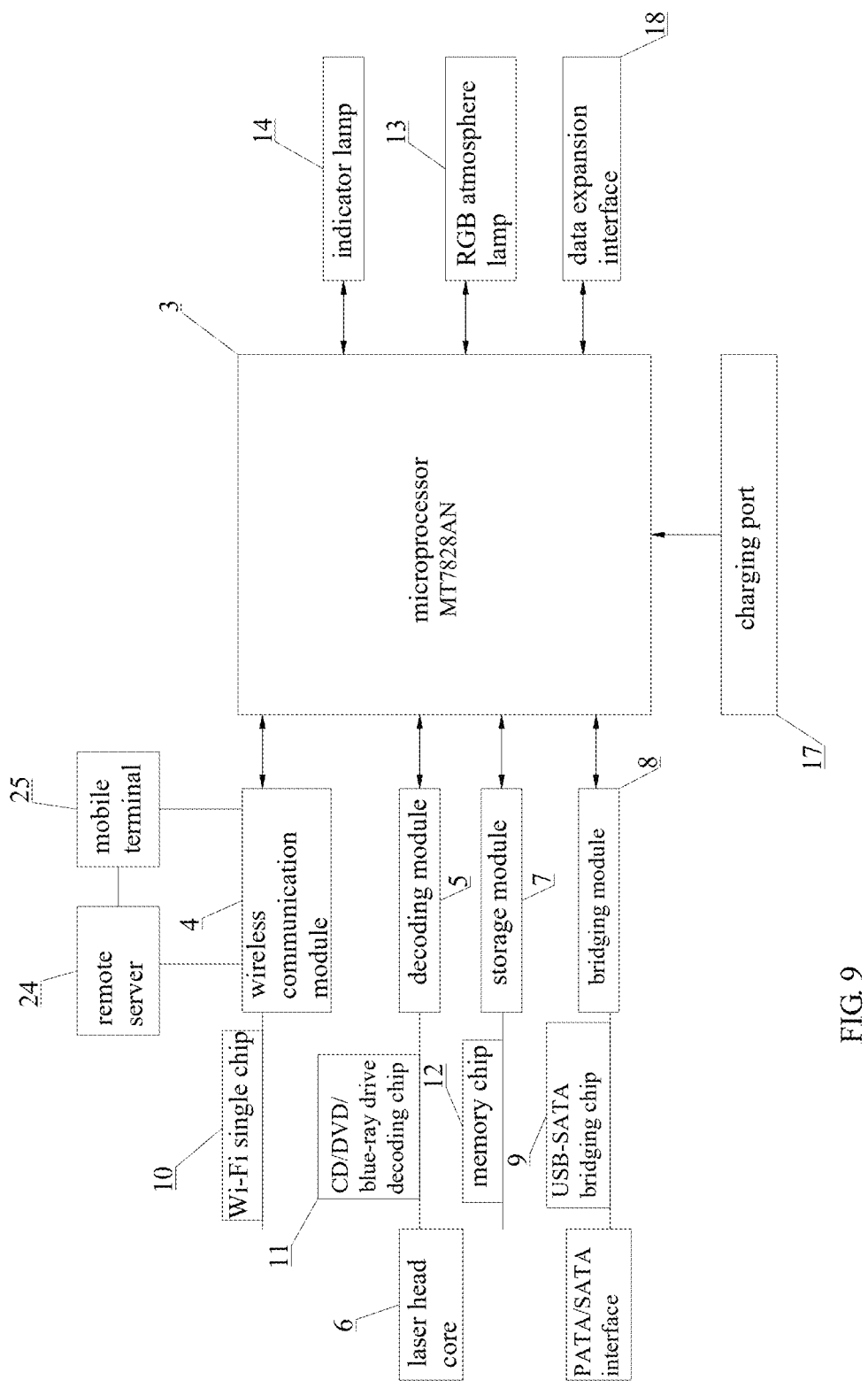
FIG. 9 is a schematic diagram of a hardware architecture of a remote transmission controllable external optical disc driver device provided in an embodiment of the present disclosure.
Figure 10:
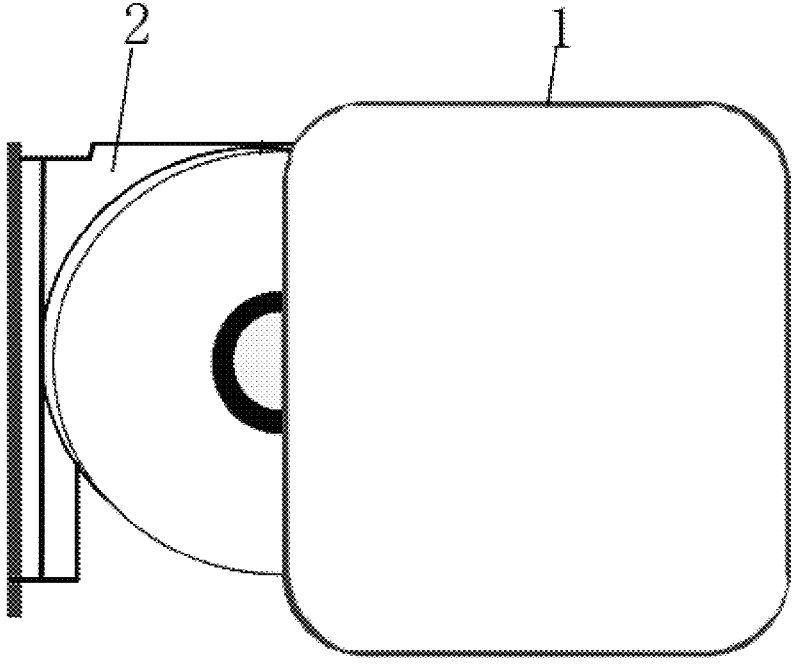
FIG. 10 is an opened schematic structural diagram of a remote transmission controllable external optical disc driver device provided in an embodiment of the present disclosure.

Specifically, referring to FIG. 3, in the aspect of data signal processing, in the process of converting the analog signals into the digital signals by the decoding chip, sampling is performed in certain continuous frequency and time intervals, the amplitude range of each sample is divided into a plurality of intervals, each small interval sample is sampled, and the sample is quantified to limited discrete values by means of the mean filtering algorithm or the adaptive quantization technology. The quantified digital values are binarily encoded to obtain the digital signals.

In a possible embodiment, the preset filtering algorithm is mean filtering, and a mean filtering process includes:

> each numerical value of the analog signals is replaced with a mean value of numerical values in a neighborhood thereof; for a filter window with the size of m×n, it is assumed that pixel values in the window are respectively p1, p2, p3, . . . , p(m×n), a new value P of a center pixel after mean filtering is: P=(p1+p2+p3+ . . . +p(m×n))/(m×n). Referring to FIG. 4, for a 3×3 continuous array, a mean value of 9 numerical values is calculated to replace the value of the central numerical value.

In a possible embodiment, the preset filtering algorithm is median filtering, and a median filtering process includes:

> it is assumed that there is a one-dimensional digital sequence x[1], x[2], . . . , x[m], where the size of the window of median filtering is m; for each element x[i] in the digital sequence, m elements around the element x[i], i.e., x[i−(m−1)/2], . . . , x[i], . . . , x[i+(m−1)/2] are taken; and the m elements are sequenced, and the original element x[i] is sequenced with a sequenced median value as an output value. Referring to FIG. 5, for a 3×3 array with a window m, a filtering process is performed.

Referring to FIG. 6, in a possible embodiment, the preset filtering algorithm is Gaussian filtering, and a Gaussian filtering process includes:

> it is assumed that there is a very small 3×3 gray image, a 3×3 Gaussian kernel is used, a standard deviation $\sigma$ is set according to requirements, assuming $\sigma=1$, a corresponding Gaussian weight is calculated, and filtering processing is performed on the center pixel value 40 to obtain:

$$(10*1/16 + 20*2/16 + 15*1/16 + 30*2/16 +$$
$$40*4/16 + 25*2/16 + 18*1/16 + 22*2/16 + 16*1/16) = 24.5625$$

A Gaussian weight is calculated for each pixel in an image to process the image by Gaussian filtering. In this way, Gaussian filtering performs smoothing processing on the image according to the spatial positions and weights of the pixels, so that the noise is reduced.

Referring to FIGS. 7, 8, 9, and 10, the embodiment of the present disclosure further provides a remote transmission controllable external optical disc driver device, used for the remote transmission controllable external optical disc driver data processing method in the above embodiment, including an optical disc driver housing 1, where an optical disc driver tray 2 is arranged in the optical disc driver housing 1, and further including a microprocessor 3, a wireless communication module 4, a decoding module 5, a storage module 7, and a bridging module 8, where > the wireless communication module 4 and the microprocessor 3 are electrically connected, the wireless communication module 4 is used in the external optical disc driver device and a remote server 24, a connection relation is established between the external optical disc driver device and the mobile terminal 25 for wireless transmission of audios, videos, and files, and data in an optical disc is read to the mobile terminal 25 and the remote server 24 or data in the mobile terminal 25 and the remote server 24 is burnt to the optical disc through the wireless communication module 4;
>
> the decoding module 5 and the microprocessor 3 are electrically connected, the decoding module 5 is electrically connected to a laser head core 6, the decoding module 5 is configured to decode and read the data in the optical disc put in the optical disc driver tray 2 through the laser head core 6 to obtain optical disc data signals;
>
> the storage module 7 and the microprocessor 3 are electrically connected, and the storage module 7 is configured to perform dynamic random storage on the optical disc data signals read by the decoding module 5; and
>
> the bridging module 8 and the microprocessor 3 are electrically connected, the bridging module 8 is configured with a USB-SATA bridging chip 9, and the bridging module 8 is configured to connect the external optical disc driver device to an appointed device through a PATA/SATA interface configured in the USB-SATA bridging chip 9.

In the embodiment, the wireless communication module 4 is configured with a WiFi single chip 10, the WiFi single chip 10 carries an external onboard antenna, a model of the WiFi single chip 10 is MT7612EN, the WiFi single chip 10 supports a 2.4/5 GHz double frequency 802.11a/b/g/n/ac wireless standard, provides the highest PHY rate reaching up to 867 Mbps, and has wireless connections with abundant functions and a long distance reliable throughput. The working frequency band covers 2.4 GHz and 5 GHZ, and the WiFi single chip is capable of providing a faster wireless connection speed and a better signal penetration capacity, which meets the requirements of the optical disc driver on high speed and stable connection.

In the embodiment, the decoding module 5 is configured with a CD/DVD/Blue-ray drive decoding chip 11, a model of the CD/DVD/Blue-ray drive decoding chip 11 is MT1887/MT1865/MT3118/MT8581, and the CD/DVD/Blue-ray drive decoding chip has an excellent hardware decoding capacity and supports Dolby and DTS sound effects. The laser head core 6 is located in the optical disc driver housing 1, a model of the laser head core 6 is CM1388/BW-16D1H-U PRO, and the laser head core is capable of being compatible with various optical discs in different formats.

In the embodiment, the storage module 7 is configured with a memory chip 12, a model of the memory chip 12 is A3R1GE30JBF/MX2516433f/W25Q16DVZPIG/MX25V20066, and the memory chip is capable of being used for reading, scrubbing, and programming operations at 2.3-3.6V.A model of the USB-SATA bridging chip 9 is INIC-1618N/μPD720231/JMS578, and a bridging solution that a PATA/SATA interface device is connected to the external optical disc driver device to support transmission of devices with different types of interfaces.

In the embodiment, a RGB atmosphere lamp 13 is arranged on a side part of the optical disc driver housing 1, and the RGB atmosphere lamp 13 and the microprocessor 3 are electrically connected; an indicator lamp 14 is further arranged on a front part of the optical disc driver tray 2, and the indicator lamp 14 and the microprocessor 3 are electrically connected; and the indicator lamp 14 is configured to indicate a working state of the external optical disc driver device.

In the embodiment, an eject button 15 is further arranged on the front part of the optical disc driver tray 2; the eject button 15 is configured to eject the optical disc driver tray 2, and in an electrified state, a core tray is ejected automatically through the eject button 15, so that it is convenient for a user to uninstall the optical disc.

Besides, a forced eject hole 16 is further formed in the front part of the optical disc driver tray 2, and a forced operation is carried out through the forced eject hole 16 to take out the optical disc in the optical disc driver tray 2 and restore a normal working state; and when the external optical disc driver device cannot be operated normally, a forced operation can be performed on a reset button in the forced eject hole 16 to take out the optical disc and restore to the normal working state.

A charging port 17 is further arranged on a rear side of the optical disc driver housing 1, and the charging port 17 and the microprocessor 3 are electrically connected; and the charging port 17 is configured to supply power to the external optical disc driver device, and a power supply voltage of the charging port 17 can be compatible with 5V and 12V inputs simultaneously.

A data expansion interface 18 is further arranged on the rear side of the optical disc driver housing 1, and the data expansion interface 18 includes an SD card interface 19, a TF card interface 20, a USB3.0 interface 21, a Type-C interface 22, and an HDMI interface 23; and the data expansion interface 18 and the microprocessor 3 are electrically connected, and the data expansion interface 18 is configured to directly transmit the data to a vehicle-mounted system/computer/television by the external optical disc driver device.

In a possible embodiment, data in an SD card, a TP card, and a USB flash disc can be read through the data expansion interface 18 such as the SD card interface 19, the TF card interface 20, the USB3.0 interface 21, the Type-C interface 22, and the HDMI interface 23, and are uploaded to a mobile phone APP or a computer. The data in the mobile phone or the computer can also be directly stored in the SD card, the TP card, and the USB flash disc through the WiFi chip.

Figure 11:
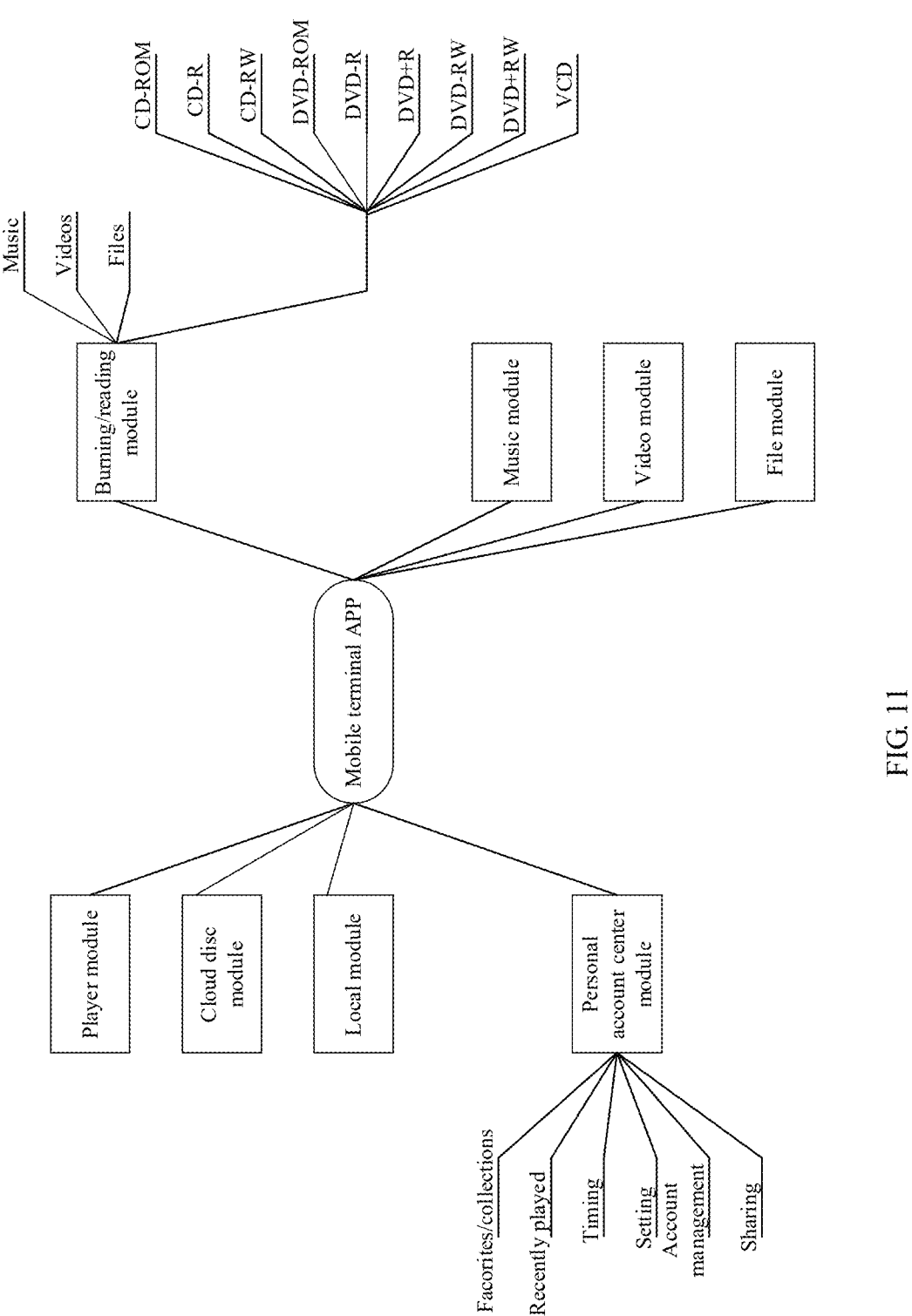
FIG. 11 is a functional frame diagram of a mobile terminal APP in a remote transmission controllable external optical disc driver device provided in an embodiment of the present disclosure.

Referring to FIG. 11, in a possible embodiment, the mobile terminal 25 is configured with a player module, a cloud disc module, a local module, a personal account center module, a burning/reading module, a music module, a video module, and a file module. The player module is configured to present elements such as a play control button, a progress bar and volume adjustment to the user, so that it is convenient for the user to operate and control multimedia play. The cloud disc module is configured to provide file storage, backup, synchronization, and share services for the user, so that it is convenient for the user to access and manage his/her own files among different devices. The personal account center module is configured to represent user personal information, favorite and collection contents, setting options, timing, account management, play records, and the like in a centralized manner, so that it is convenient for the user to perform personalized setting and manage activities in his/her own APP. The burning/reading module is configured to burn data to the optical disc and read data from the optical disc to the APP, which meets the requirements of the user on data backup, storage and transfer, and convenient access. The music module and the video module provide music/video lists, search, downloads and services such as creating song lists and classification to the user. The file module is configured to manage, view, upload, download, and share various types of files to provide convenient file storage and processing services to the user.

In a possible embodiment, the data in the optical disc can be outputted to the computer or the mobile phone from the type-C data expansion interface 18 through a wired connection by the USB-SATA bridging chip 9, so that the optical disc data is directly read to the computer or the mobile phone. The data in the computer or the mobile phone can also be outputted by connecting the type-C data expansion interface 18, and is burnt to the optical disc after being converted by the USB-SATA bridging chip 9.

In a possible embodiment, the content in the optical disc can be read and is directly transmitted to the computer or the television in a wired manner through the HDMI interface 23.

In a possible embodiment, the content in the optical disc can be read and is directly transmitted to the computer or the vehicle-mounted system in a wired manner through the data expansion interface 18.

To sum up, the present disclosure includes the optical disc driver housing 1, the optical disc driver tray 2 being arranged in the optical disc driver housing 1, and further includes the microprocessor 3, the wireless communication module 4, the decoding module 5, the storage module 7, and the bridging module 8; the wireless communication module 4 and the microprocessor 3 are electrically connected, the wireless communication module 4 is used in the external optical disc driver device and the remote server 24, a connection relation is established between the external optical disc driver device and the mobile terminal 25 to wirelessly transmit audios, videos and files, and data in the optical disc is read to the mobile terminal 25 and the remote server 24 or data in the mobile terminal 25 and the remote server 24 is burnt to the optical disc through the wireless communication module 4; the decoding module 5 and the microprocessor 3 are electrically connected, the decoding module 5 is electrically connected to the laser head core 6, and the decoding module 5 is configured to decode and read the data in the optical disc put in the optical disc driver tray 2 through the laser head core 6 to obtain optical disc data signals; the storage module 7 and the microprocessor 3 are electrically connected, and the storage module 7 is config- ured to perform dynamic random storage on the optical disc data signals read by the decoding module 5; and the bridging module 8 and the microprocessor 3 are electrically con- nected, the bridging module 8 is configured with the USB-SATA bridging chip 9, and the bridging module 8 is con- figured to connect the external optical disc driver device to an appointed device through the PATA/SATA interface con- figured in the USB-SATA bridging chip 9. The method provided by the present disclosure includes the following steps: putting an optical disc loaded with data in an optical disc driver tray 2, irradiating an optical disc track with a laser head core 6 to read the data, and converting read optical disc data objects with a decoding chip configured in a decoding module 5; transmitting the optical disc data objects converted by the decoding module 5 to a storage module 7, and performing dynamic random storage on optical disc data signals through a memory chip 12 configured in the storage module 7; transmitting the optical disc data objects stored in the storage module 7 to the microprocessor 3 to be pro- cessed, and then transmitting the data processed by the microprocessor 3 through a wireless communication module 4 to a remote server 24 and a mobile terminal 25 to be stored; putting a blank optical disc in the optical disc tray 2, setting a format of an optical disc file needed to be burnt through the mobile terminal 25, and transmitting the optical disc data objects to be burnt in the local or remote server 24 to the memory chip 12 configured in the storage module 7 through a Wi-Fi antenna of the mobile terminal 25; and converting the analog signals of the optical disc data objects to be burnt in the storage module 7 into digital signals by the decoding module 5, and burning the converted digital signals with the laser head core 6 to the blank optical disc in the optical disc tray 2. The present disclosure is capable of adapting to changes of the computer technology, improves the applica- tion efficiency of the optical disc driver device, expands the application scenarios of the optical disc driver device, and is capable of meeting the diversified usage requirements of users.

The present disclosure has been specifically described in detail above through general description and specific embodiments. It shall be appreciated that based on the technical concept of the present disclosure, several conven- tional adjustments or further innovations can further be made on the specific embodiments. Technical solutions obtained by the conventional adjustments or further inno- vations also fall within the protection scope of claims of the present disclosure without departing from the technical concept of the present disclosure.

What is claimed is:

1. A remote transmission controllable external optical disc driver data processing method, comprising the following steps:

putting an optical disc loaded with data in an optical disc driver tray, irradiating an optical disc track with a laser head core to read the data, and converting read optical disc data objects with a decoding chip configured in a decoding module;

transmitting the optical disc data objects converted by the decoding module to a storage module, and performing dynamic random storage on optical disc data signals through a memory chip configured in the storage mod- ule;

transmitting the optical disc data objects stored in the storage module to the microprocessor to be processed, and then transmitting the data processed by the micro- processor through a wireless communication module to a remote server and a mobile terminal to be stored;

putting a blank optical disc in the optical disc tray, setting a format of an optical disc file needed to be burnt through the mobile terminal, and transmitting the opti- cal disc data objects to be burnt in a local or remote server to the memory chip configured in the storage module through a Wi-Fi antenna of the mobile termi- nal; and converting analog signals of the optical disc data objects to be burnt in the storage module into digital signals by the decoding module, and burning the converted digital signals with the laser head core to the blank optical disc in the optical disc tray.

2. The remote transmission controllable external optical disc driver data processing method according to claim 1, wherein the process of converting the analog signals of the optical disc data objects to be burnt in the storage module into digital signals by the decoding module comprises:

performing sampling according to a preset frequency and a time interval, and dividing an amplitude range of each sampled sample into a plurality of intervals; sampling each interval sample, and quantifying the sample by a preset filtering algorithm to limited discrete values; and binarily encoding quantified digital values to obtain the digital signals.

3. The remote transmission controllable external optical disc driver data processing method according to claim 1, wherein a present filtering algorithm is mean filtering, and a mean filtering process comprises:

replacing each numerical value of the analog signals with a mean value of numerical values in a neighborhood thereof; for a filter window with the size of m×n, assuming that pixel values in the window are respec- tively p1, p2, p3, . . . , p(m×n), a new value P of a center pixel after mean filtering is: $P=(p1+p2+p3+ \ldots +p(m \times n))/(m \times n)$.

4. The remote transmission controllable external optical disc driver data processing method according to claim 1, wherein a preset filtering algorithm is median filtering, and a median filtering process comprises:

assuming that there is a one-dimensional digital sequence x[1], x[2], . . . , x[m], wherein the size of the window of median filtering is m; for each element x[i] in the digital sequence, taking m elements around the element x[i], i.e., x[i−(m−1)/2], . . . , x[i], . . . , x[i+(m−1)/2]; and sequencing the m elements, and replacing the original element x[i] with a sequenced median value as an output value.

5. The remote transmission controllable external optical disc driver data processing method according to claim 1, wherein a preset filtering algorithm is Gaussian filtering, and a Gaussian filtering process comprises:

using a 3×3 Gaussian kernel, setting a standard deviation σ according to requirements, calculating a correspond- ing Gaussian weight, filtering a center pixel value, and then calculating a Gaussian weight for each pixel in an image to process the image by Gaussian filtering.

6. A remote transmission controllable external optical disc driver device, used for the remote transmission controllable external optical disc driver data processing method according to claim 1, comprising an optical disc driver housing, wherein an optical disc driver tray is arranged in the optical disc driver housing, and further comprising a microprocessor, a wireless communication module, a decoding module, a storage module, and a bridging module, wherein the wireless communication module and the microprocessor are electrically connected, the wireless communication module is used in the external optical disc driver device and a remote server, a connection relation is established between the external optical disc driver device and the mobile terminal for wireless transmission of audios, videos, and files, and data in an optical disc is read to the mobile terminal and the remote server or data in the mobile terminal and the remote server is burnt to the optical disc through the wireless communication module;

the decoding module and the microprocessor are electrically connected, the decoding module is electrically connected to a laser head core, the decoding module is configured to decode and read the data in the optical disc put in the optical disc driver tray through the laser head core to obtain optical disc data signals;

the storage module and the microprocessor are electrically connected, and the storage module is configured to perform dynamic random storage on the optical disc data signals read by the decoding module; and the bridging module and the microprocessor are electrically connected, the bridging module is configured with a USB-SATA bridging chip, and the bridging module is configured to connect the external optical disc driver device to an appointed device through a PATA/SATA interface configured in the USB-SATA bridging chip.

7. The remote transmission controllable external optical disc driver device according to claim 6, wherein the wireless communication module is configured with a WiFi single chip, the WiFi single chip carries an external onboard antenna, and a model of the WiFi single chip is MT7612EN; and the mobile terminal is configured with a player module, a cloud disc module, a local module, a personal account center module, a burning/reading module, a music module, a video module, and a file module.

8. The remote transmission controllable external optical disc driver device according to claim 6, wherein the decoding module is configured with a CD/DVD/Blu-ray drive decoding chip, and a model of the CD/DVD/Blu-ray drive decoding chip is MT1887/MT1865/MT3118/MT8581; and the laser head core is located in the optical disc driver housing, and a model of the laser head core is CM1388/ BW-16D1H-U PRO.

9. The remote transmission controllable external optical disc driver device according to claim 6, wherein the storage module is configured with a memory chip, and a model of the memory chip is A3R1GE30JBF/MX2516433f/ W25Q16DVZPIG/MX25V20066; and a model of the USB-SATA bridging chip is INIC-1618N/ μPD720231/JMS578.

10. The remote transmission controllable external optical disc driver device according to claim 6, wherein an RGB atmosphere lamp is arranged on a side part of the optical disc driver housing, and the RGB atmosphere lamp and the microprocessor are electrically connected;

an indicator lamp is further arranged on a front part of the optical disc driver tray , and the indicator lamp and the microprocessor are electrically connected; the indicator lamp is configured to indicate a working state of the external optical disc driver device;

an eject button is further arranged on the front part of the optical disc driver tray; the eject button is configured to eject the optical disc driver tray;

a forced eject hole is further formed in the front part of the optical disc driver tray, and a forced operation is carried out through the forced eject hole to take out the optical disc in the optical disc driver tray and restore a normal working state;

a charging port is further arranged on a rear side of the optical disc driver housing, and the charging port and the microprocessor are electrically connected; the charging port is configured to supply power to the external optical disc driver device; and a data expansion interface is further arranged on the rear side of the optical disc driver housing, and the data expansion interface comprises an SD card interface, a TF card interface, a USB3.0 interface, a Type-C interface, and an HDMI interface; and the data expansion interface and the microprocessor are electrically connected, and the data expansion interface is configured to directly transmit the data to a vehicle-mounted system/computer/television by the external optical disc driver device.

\* \* \* \* \*